United States Patent
Chen et al.

(10) Patent No.: US 7,553,914 B2
(45) Date of Patent: Jun. 30, 2009

(54) LAMINATING ADHESIVE FOR RETORT POUCHES

(75) Inventors: Mai Chen, Hoffman Estates, IL (US);
San Ardi Lee, Crystal Lake, IL (US);
Keith B. Potts, Elgin, IL (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 12/148,605

(22) Filed: Apr. 21, 2008

(65) Prior Publication Data

US 2008/0261048 A1    Oct. 23, 2008

Related U.S. Application Data

(60) Provisional application No. 60/925,278, filed on Apr. 19, 2007.

(51) Int. Cl.
*C08F 20/00* (2006.01)
*C08G 18/00* (2006.01)

(52) U.S. Cl. .................. 525/440.03; 528/73; 528/81

(58) Field of Classification Search ............ 528/26, 528/28, 73, 81; 525/29, 440.03
See application file for complete search history.

(56) References Cited

U.S. PATENT DOCUMENTS

| | | | |
|---|---|---|---|
| 4,507,447 A * | 3/1985 | Yamazaki et al. | 525/528 |
| 5,096,980 A | 3/1992 | Yamazaki et al. | |
| 5,731,090 A | 3/1998 | Chen | |
| 6,538,095 B2 | 3/2003 | Imai et al. | |
| 6,596,819 B2 | 7/2003 | Morikawa et al. | |
| 6,649,084 B2 | 11/2003 | Morikawa et al. | |
| 2002/0157789 A1 | 10/2002 | Imai et al. | |
| 2003/0096110 A1 | 5/2003 | Terada et al. | |
| 2005/0214530 A1 | 9/2005 | Tanaka et al. | |

FOREIGN PATENT DOCUMENTS

| EP | 0084364 | 7/1983 |
|---|---|---|
| EP | 1090972 | 4/2001 |

* cited by examiner

*Primary Examiner*—Randy Gulakowski
*Assistant Examiner*—Michael Leonard
(74) *Attorney, Agent, or Firm*—Kenneth Crimaldi

(57) ABSTRACT

A method for producing a two-component bonding agent composition. The method uses a mixture whose first component contains: (i) 50 to 98 wt % of a hydroxy-terminated polyester having a hydroxyl number from 50 to 350 and hydroxyl functionality from 2 to 3; (ii) 1 to 30 wt % of an epoxy resin having an epoxy equivalent weight from 500 to 4000; and (iii) 1 to 20 wt % of an organic alkoxysilane containing $C_1$-$C_4$ alkoxy groups. The second component contains a multi-functional isocyanate having an isocyanate functionality from 1.8 to 4; wherein the second component is present relative to the first component at a molar ratio of NCO/OH groups of 0.9:1 to 3:1.

9 Claims, No Drawings

LAMINATING ADHESIVE FOR RETORT POUCHES

This application claims the benefit of priority under 35 U.S.C. §119(e) of U.S. Provisional Patent Application No. 60/925,278 filed on Apr. 19, 2007.

The present invention relates to a two-part urethane adhesive employing a silane-polyester adduct. The invention is particularly suited for use as a laminating adhesive for retort applications and is suitable, for example, for laminating SiOx coated plastic films to flexible films, aluminum foil and other substrates.

Several systems have been used as laminating adhesives for laminates to achieve good heat and moisture resistance under retort conditions. For example, a solvent-free retort adhesive composition comprising polyester, epoxy resin and an isocyanate-terminated polymer is disclosed in U.S. Pat. No. 5,731,090.

In recent years, non-metallic films coated with hydrolyzates of $Si(OR)_4$ and similar compounds ("SiOx coated films") have been introduced in retort laminates to replace aluminum foil. SiOx coated films provide extra moisture and gas barrier required for the retort pouches. Unlike laminates made with aluminum foil, laminates made with SiOx coated films allow heating in a microwave oven.

The problem addressed by this invention is to provide an improved laminating adhesive, especially for SiOx coated films.

STATEMENT OF THE INVENTION

The present invention is directed to a method for producing a two-component bonding agent composition. The method comprises steps of: (a) preparing a mixture which comprises: (i) 50 to 98 wt % of a hydroxy-terminated polyester having a hydroxyl number from 50 to 350 and hydroxyl functionality from 2 to 3; (ii) 1 to 30 wt % of an epoxy resin having an epoxy equivalent weight from 500 to 4000; and (iii) 1 to 20 wt % of an organic alkoxysilane containing $C_1$-$C_4$ alkoxy groups; (b) heating said mixture at a temperature from 100 to 150° C. until dissolution of the epoxy resin is substantially complete, and evaporating by-product $C_1$-$C_4$ alcohol to a residual $C_1$-$C_4$ alcohol content less than 0.6 wt % to produce a first component; and (c) providing a second component comprising a multi-functional isocyanate having an isocyanate functionality from 1.8 to 4; wherein said second component is present relative to said first component at a molar ratio of isocyanate/hydroxy (NCO/OH) groups of 0.9:1 to 3:1.

DETAILED DESCRIPTION OF THE INVENTION

All percentages mentioned herein are by weight (wt %), and temperatures in ° C., unless specified otherwise. As used herein, "bonding agent" is an agent that is suitable for joining itself to at least a first material, and preferably also to a second material. The first and second materials may be the same or different. Multiple layers of material may be joined using the bonding agent. "Bonding agent" encompasses an adhesive, a primer, or any other suitable coating for bonding to a surface. An "organic alkoxysilane containing $C_1$-$C_4$ alkoxy groups" is a silane containing at least two $C_1$-$C_4$ alkoxy groups and an organic functional group having from one to twenty carbon atoms. An organic functional group is one which contains atoms selected from among carbon, hydrogen, nitrogen, oxygen, and sulfur.

In some embodiments of the invention, the organic alkoxysilane has formula $R^1$-A-$Si(OR^2)_3$, wherein $R^1$ is a functional group selected from among glycidyl, amino, vinyl, (meth)acryloyl, carboxyl and mercapto; A is a difunctional radical having from 1 to 10 carbon atoms; and $R^2$ is $C_1$-$C_4$ alkyl. A may be aromatic, aliphatic or alicyclic, and may be saturated or unsaturated. Preferably, $R^2$ is $C^1$-$C^3$ alkyl, and more preferably methyl or ethyl. In some embodiments of the invention, A is a —$(CH_2)_n$—$(X)_j$—$(CH_2)_m$— group, where n is from 1 to 6, X is NH or O, j is 0 or 1, and m is 2 or 3 when j is 1 and 0 when j is 0. In some embodiments, j is 1, X is NH, m is 2 and $R^1$ is an amino group. In some embodiments, j and m are 0, and n is 1 to 3; preferably n is 3. In some embodiments, $R^2$ is methyl or ethyl, alternatively $R^2$ is methyl. In some embodiments, $R^1$ is a glycidyl group. In some embodiments of the invention, the amount of organic alkoxysilane in the first component is no greater than 18%, alternatively no greater than 15%, alternatively no greater than 12%, based on the weight of the first component. In some embodiments, the amount of organic alkoxysilane is at least 2%, alternatively at least 3%, alternatively at least 4%, alternatively at least 6%, based on the weight of the first component.

Mono-functional alcohol can be generated over time from the transesterification of silane alkoxy groups with polyester hydroxy groups when the alkoxysilane and the polyester are mixed. When it contacts the isocyanate, the mono-functional alcohol can terminate the urethane-forming reaction. The alcohol also can decrease the heat and moisture resistance of the adhesive under retort conditions. The method of this invention minimizes the formation of mono-functional alcohol in the polyester and silane mixture by pre-forming a polyester-silane adduct. It is believed that the heating and evaporation steps accelerate reaction of the organic alkoxysilane, $R^1$-A-$Si(OR^2)_3$ with the hydroxy-terminated polyester to produce a silane-hydroxy-terminated polyester adduct of formula $R^1$-A-$Si(OR^2)_2(OR^3)$, wherein $R^1$, A, and $R^2$ are as defined previously. $OR^3$ is a group derived by removing a hydrogen atom from a hydroxyl group of the hydroxy-terminated polyester. In some embodiments of the invention, one or both remaining $R^2$ groups are replaced by reaction of the alkoxysilane with additional molecules of the hydroxy-terminated polyester. In some embodiments, the mixture of hydroxy-terminated polyester, epoxy resin and alkoxysilane is heated at 100 to 150° C. for 2 to 5 hours, or longer if necessary. In some embodiments, the temperature is from 100 to 130° C. Preferably, the epoxy resin is completely dissolved in the polyester, but there may be trace amounts of solids remaining. In some embodiments, the mono-functional alcohol, $R^2OH$ is evaporated to reduce the level of mono-functional alcohol to less than 0.5%, alternatively less than 0.4%, alternatively less than 0.3%, alternatively less than 0.2%. Preferably, the evaporation is performed at reduced pressure, preferably at a pressure less than 100 mm Hg (13 kPa), alternatively at a pressure less than 40 mm Hg (5.2 kPa). The time necessary to reduce the alcohol content to the desired level will vary somewhat with the alcohol and the operating pressure and temperature, and can easily be determined by one skilled in the art, but typically, the evaporation will be performed for 2 to 24 hours at a temperature from 50° C. to 130° C., alternatively from 80° C. to 130° C. for 2 to 18 hours.

Polyesters useful in this invention are liquid at 20° C., and preferably have low viscosity at 20° C., e.g., 500 to 1,000 cps. The polyester is formed primarily from dicarboxylic acids and diols. Diols are used in excess, whereby the polyester is OH-terminated. Aliphatic diols and dicarboxylic acids are preferred, although aromatic diols and dicarboxylic acids may also be used. In selection of diols and dicarboxylic acids for forming the polyester, consideration is given to compatibility with food and/or medicine. Suitable diols include, but are not limited to diethylene glycol, propylene glycol, ethylene glycol, hexane diol, butane diol, neopentyl glycol, etc. Suitable dicarboxylic acids include, but are not limited to adipic acid, terephthalic acid, isophthalic acid, sebacic acid, azelaic acid, etc. A slight amount of branching is acceptable; thus, polyols, such as trimethylol propane, and polycarboxylic acids (and anhydrides), such as trimellitic anhydride, may be incorporated into the polyester chain. The hydroxyl functionality of the polyester provides the means by which the polyester is cross-linked with the polyisocyanate to form a cross-linked urethane. The polyester may have some acid functionality, i.e., up to an acid number of about 25, but no acid functionality is required or even desired. The hydroxy-terminated polyester will have a hydroxyl functionality from 2 to 3, and thus will contain at least two hydroxyl groups. Preferred hydroxy-terminated polyesters are selected from diols, triols or mixtures thereof. The polyol is sufficiently nonvolatile that it will be fully or at least partially available for reaction with the isocyanate during mixing operations. In some embodiments of the invention, the hydroxy-terminated polyester will have a hydroxyl number of at least 100, alternatively at least 150, alternatively at least 200. In some embodiments, the hydroxy-terminated polyester will have a hydroxyl number no greater than 300, alternatively no greater than 280, alternatively no greater than 250. In some embodiments of the invention, the amount of polyol in the first component is no more than 90 wt %, alternatively no more than 85 wt %, alternatively no more than 80%, alternatively no more than 75 wt %, based on the weight of the first component. In some embodiments, the amount of polyol is at least 55 wt %, alternatively at least 60 wt %, alternatively at least 65 wt %. In some embodiments of the invention, the amount of the first component in the two-component composition is from 30 to 80 wt % of the composition, alternatively from 45 to 70 wt %.

Particularly suitable epoxy resins are bisphenol A epoxy resins having both epoxy and hydroxyl functionality as described above. Typically, the epoxy resin is solid at 20° C. The OH functionality of the epoxy resin provides that the epoxy resin is cross-linked in the urethane curing reaction. In some embodiments of the invention, the epoxy resin has an epoxy equivalent weight no greater than 3000, alternatively no greater than 2000, alternatively no greater than 1500, alternatively no greater than 1000, alternatively no greater than 750. In some embodiments, the epoxy equivalent weight is at least 550. Epoxy resins which are solid at ambient temperature can be dissolved in the polyester to form a liquid composition. In some embodiments, the amount of epoxy resin in the first component is no greater than 25%, alternatively no greater than 22%, based on the weight of the first component. In some embodiments, the amount of epoxy resin is at least 5%, alternatively at least 10%, alternatively at least 12%, alternatively at least 14% based on the weight of the first component.

The polyisocyanate employed may be any suitable polyisocyanate, but preferably it is an aliphatic polyisocyanate, an aromatic polyisocyanate or a mixture thereof. Preferably, the polyisocyanate has a functionality of at least 2. Examples of suitable polyisocyanates include those based on toluene diisocyanate (TDI), isophorone diisocyanate (IPDI), hexamethylene diisocyanate (HDI), diphenyl methane diisocyanate (MDI), dicyclohexyl methane diisocyanate (HMDI), isomers thereof or mixtures thereof. Prepolymers of a polyisocyanate and a polyol may also be employed. Aliphatic polyisocyanates are especially preferred. The relative proportions of isocyanate groups to isocyanate-reactive groups may vary as desired, within a molar ratio of NCO/OH groups of 0.9:1 to 3:1. In some embodiments of the invention, the NCO/OH group molar ratio is from 0.9:1 to 1.5:1. In some embodiments of the invention, the amount of the second component in the two-component composition is from 20 to 70 wt % of the composition, alternatively from 30 to 55 wt %.

As gathered from the foregoing, the system of the present invention contemplates the employment of two components, which preferably are mixed using a suitable mixer (e.g., an electrically, pneumatically, or an otherwise powered mechanical mixer) prior to or during application to a substrate to form the bonding agent. Thus, the first component typically will be packaged separately from the polyisocyanate. Mixing may take place at any suitable time in the laminating process, such as before, during, or as a result of the application process. All of the present steps may be carried out under ambient room temperature conditions. As desired, heating or cooling may be employed.

The bonding agent of the present invention is useful for bonding two to four substrates together. The substrates may be similar material or dissimilar material. In a preferred embodiment, a layer of the bonding agent is applied to a first substrate layer, and the resulting bonding agent layer is covered with a second substrate layer to form a laminated article wherein the two substrates are bonded together by the dried layer of bonding agent. A third and fourth layer of film can be added to the laminate to form three- or four-layer laminates. In a preferred embodiment, the substrate layers are provided in the form of rolls of substrate material. The sheets may be on the order of 1 to 10 mils in thickness. Larger thicknesses are also possible, as are smaller thicknesses (e.g., on the order of 1 or more microns).

The compositions of the present invention can be applied to desired substrates using conventional application techniques such as solvent-less laminators, rotogravure printing, flexographic printing, conventional or airless spray, roll coating, brush coating, wire wound rod coating, knife coating, or coating processes such as curtain-, flood-, bell-, disc-, and dip-coating processes. Coating with the bonding agent may be done over an entire surface or only a portion of it, such as along an edge, or at intermittent locations.

The bonding agent is particularly attractive for packaging and sealing applications. For example, in one aspect, a plastic film, SiOx coated film, metal film, or metallized plastic film is laminated (e.g., over all or at least a portion of its surface, such as along its edges, or at intermittent locations) with the bonding agent of the present invention. In one such application, food may be packaged for boil-in-bag preparation, or the resulting laminate might be used for sealing or packaging some other article.

Neither the first component nor the second component requires any organic solvent; thus, the composition described herein are essentially 100% solids adhesive compositions. While organic solvents may be present in minor amounts, e.g., up to about 2 wt %, alternatively up to about 1 wt % (including by-product alcohol), for viscosity adjustment or other purposes, from a volatile organic content (VOC) standpoint, addition of organic solvents is undesirable.

EXAMPLES

Example 1

The first component was prepared from 144 grams of epoxy resin EPON 1002F (Bisphenol A-glycidyl alcohol condensation product, available from Hexion Co.), having an epoxy equivalent weight of 600-700 dissolved in 576 grams of polyester at 100° C. The polyester was a 500 Mw diethylene adipate with a hydroxyl number of 225. (3-Glycidoxypropyl)trimethoxysilane (80 g) was added in to the polyester/epoxy mixture. The mixture was heated to 120° C. for 3 hours to dissolve the epoxy resin, and then evaporated under vacuum at 20 mm Hg (2600 Pa) residual pressure and 110 to 120° C. for 9 hours to strip excess methanol from the reaction. The residual methanol by-product level was 0.26%.

The second component was a polymeric hexamethylene diisocyanate with % NCO of 21.5% and functionality of 3.

130 grams of the first component and 100 grams of the second component were mixed at a NCO/OH molar ratio of 1.0 before making the laminate. The adhesive mixture was applied immediately to the NYLON film and nipped together with the CPP film in the conventional manner. The coating weight was 1.0-1.2 pounds/ream (1.6-2 g/m$^2$) and the nip temperature was 50° C. SiOx coated PET film was then laminated to the NYLON/CPP laminate to form a SiOx film/NYLON/CPP triplex laminate.

The retort test was conducted one week later after the adhesive was fully cured. The triplex laminate was made into pouches and filled with water for the retort test at 132° C. and 15 psi (205 kPa) for 30 minutes. The adhesion between the SiOx film and the NYLON after the retort test remained greater than the strength of the film.

Comparative Example 1

The first component was prepared from 144 grams of epoxy resin EPON 1002F dissolved in 576 g of polyester at 100° C. The polyester was a 500 Mw diethylene adipate with hydroxyl number of 225.

The second component was a polymeric hexamethylene diisocyanate with % NCO of 21.5% and functionality of 3.

120 grams of the first component and 100 grams of the second component were mixed together at a NCO/OH molar ratio of 1.0 before making the laminate. The adhesive mixture was applied and tested as in Example 1. There was tunneling between the SiOx coated PET and the NYLON after the retort test. The adhesion between these layers was almost zero.

Comparative Example 2

The first component was prepared from 144 grams of epoxy resin EPON 1002F dissolved in 576 g of polyester at 100° C. The polyester was a 500 Mw diethylene adipate with hydroxyl number of 225. (3-Glycidoxypropyl)triethoxysilane (80 g) was added in to the polyester/epoxy mixture at ambient temperature. The residual methanol by-product level was 0.62%.

The second component was a polymeric hexamethylene diisocyanate with % NCO of 21.5% and a functionality of 3.

130 grams of the first component and 100 grams of the second component were mixed together at a NCO/OH molar ratio of 1.0 before making the laminate. The adhesive mixture was applied and tested as in Example 1. There was no tunneling between the SiOx coated PET and the NYLON after the retort test, but the adhesion between these layers decreased to 148 g/15 mm with adhesive split and destruction.

|  | First component preparation | Adhesion on SiOx/Nylon before retort test | Adhesion on SiOx/Nylon after retort test |
| --- | --- | --- | --- |
| Ex. 1 | silane added at 100° C., vacuum @ 20 mmHg | Film destruct | Film destruct |
| Comp. Ex. 1 | no silane present | Film destruct | <6 g/15 mm, total delamination |
| Comp. Ex. 2 | silane added at ambient temperature | Film destruct | 148 g/15 mm, adhesive split |

What is claimed is:

1. A method for producing a two-component bonding agent composition, comprising steps of:
    (a) preparing a mixture which comprises: (i) 50 to 98 wt % of a hydroxy-terminated polyester having a hydroxyl number from 50 to 350 and hydroxyl functionality from 2 to 3; (ii) 1 to 30 wt % of an epoxy resin having an epoxy equivalent weight from 500 to 4000; and (iii) 1 to 20 wt % of an organic alkoxysilane containing $C_1$-$C_4$ alkoxy groups;
    (b) heating said mixture at a temperature from 100 to 150° C. until dissolution of the epoxy resin is substantially complete, and evaporating $C_1$-$C_4$ alcohol to a residual $C_1$-$C_4$ alcohol content less than 0.6 wt % to produce a first component; and
    (c) providing a second component comprising a multi-functional isocyanate having an isocyanate functionality from 1.8 to 4;
    wherein said second component is present relative to said first component at a molar ratio of NCO/OH groups of 0.9:1 to 3:1.

2. The method of claim 1 wherein the organic alkoxysilane has formula $R^1$-A-Si$(OR^2)_3$, wherein $R^1$ is a functional group selected from among glycidyl, amino, vinyl, (meth)acryloyl, carboxyl and mercapto; A is a difunctional radical having from 1 to 10 carbon atoms; and $R^2$ is $C_1$-$C_4$ alkyl.

3. The method of claim 2 wherein A is a —$(CH_2)_n$—$(X)_j$—$(CH_2)_m$— group, where n is from 1 to 6, X is NH or O, j is 0 or 1, and m is 2 or 3 when j is 1 and 0 when j is 0; and wherein $R^2$ is methyl or ethyl.

4. The method of claim 3 wherein the first component comprises 60 to 85 wt % of the hydroxy-terminated polyester, 10 to 25 wt % of the epoxy resin, and 4 to 15 wt % of the organic alkoxysilane.

5. The method of claim 4 wherein $R^1$ is glycidyl, j and m are 0, and n is 3.

6. The method of claim 5 wherein said multi-functional isocyanate is a polymeric hexamethylene diisocyanate with functionality at least 2.3.

7. The method of claim 6 wherein the hydroxyl number of the hydroxy-terminated polyester is from 150 to 280.

8. The method of claim 7, wherein the molar ratio of NCO/OH groups is from 0.9:1 to 1.5:1.

9. The method of claim 8, wherein the epoxy resin is derived from bisphenol A and is solid at 20° C.

* * * * *